United States Patent [19]

Takahashi

[11] Patent Number: 4,878,228

[45] Date of Patent: Oct. 31, 1989

[54] MICROWAVE RELAY STATION HAVING A COMMON STANDBY CHANNEL FOR SIGNALS OF DIFFERENT TYPES OF MODULATION

[75] Inventor: Kunihiko Takahashi, Tokyo, Japan

[73] Assignee: Nec Corporation, Japan

[21] Appl. No.: 880,789

[22] Filed: Jul. 1, 1986

[30] Foreign Application Priority Data

Jul. 4, 1985 [JP] Japan ................................ 60-145715

[51] Int. Cl.⁴ .......................... H04B 3/36; H04B 7/17
[52] U.S. Cl. .......................................... 375/3; 455/8; 370/16
[58] Field of Search ........................ 375/3, 3.1, 38, 17; 370/11, 16, 35; 455/140, 142, 226, 67, 143.8

[56] References Cited

U.S. PATENT DOCUMENTS

| | | | |
|---|---|---|---|
| 3,045,185 | 7/1962 | Mathwich | 455/8 |
| 3,111,624 | 11/1963 | Farkas | 455/8 |
| 3,688,197 | 8/1972 | Kahn | 455/142 |
| 3,771,059 | 11/1973 | Butler et al. | 375/17 |
| 3,878,463 | 4/1975 | Lanigan | 455/8 |
| 3,885,216 | 5/1975 | Kahn | 455/142 |
| 4,060,698 | 11/1977 | Birnie | 370/6 |
| 4,071,700 | 1/1978 | Huffman et al. | 370/16 |
| 4,181,890 | 1/1980 | Yamamoto | 455/143 |
| 4,227,255 | 10/1980 | Carrick et al. | 455/226 |
| 4,333,063 | 6/1982 | Ryu et al. | 333/18 |
| 4,355,401 | 10/1982 | Ikoma et al. | 375/5 |
| 4,363,129 | 12/1982 | Cohn et al. | 375/3 |
| 4,442,518 | 4/1984 | Morimoto | 371/8 |
| 4,477,895 | 10/1984 | Casper et al. | 370/16 |
| 4,607,390 | 8/1986 | Faugeron | 455/212 |

Primary Examiner—Robert L. Griffin
Assistant Examiner—Stephen Chin
Attorney, Agent, or Firm—Laff, Whitesel, Conte & Saret

[57] ABSTRACT

A multichannel microwave relay station has first and second channels for respectively transmitting signals of different types of modulation, such as QAM and FM modulated signals. These different types of signal rely on a common standby transmission channel that is selectively capable of transmitting the different types of signals. The type of signal currently carried by the standby channel is automatically identified by a detector circuit, such as one that can automatically distinguish differences in the frequency spectrums of the different types of signals. A selecting circuit responds to the output of the detector circuit by selecting between first and second transmitting devices in the common channel, thereby dedicating it to the identified type of signal.

15 Claims, 3 Drawing Sheets

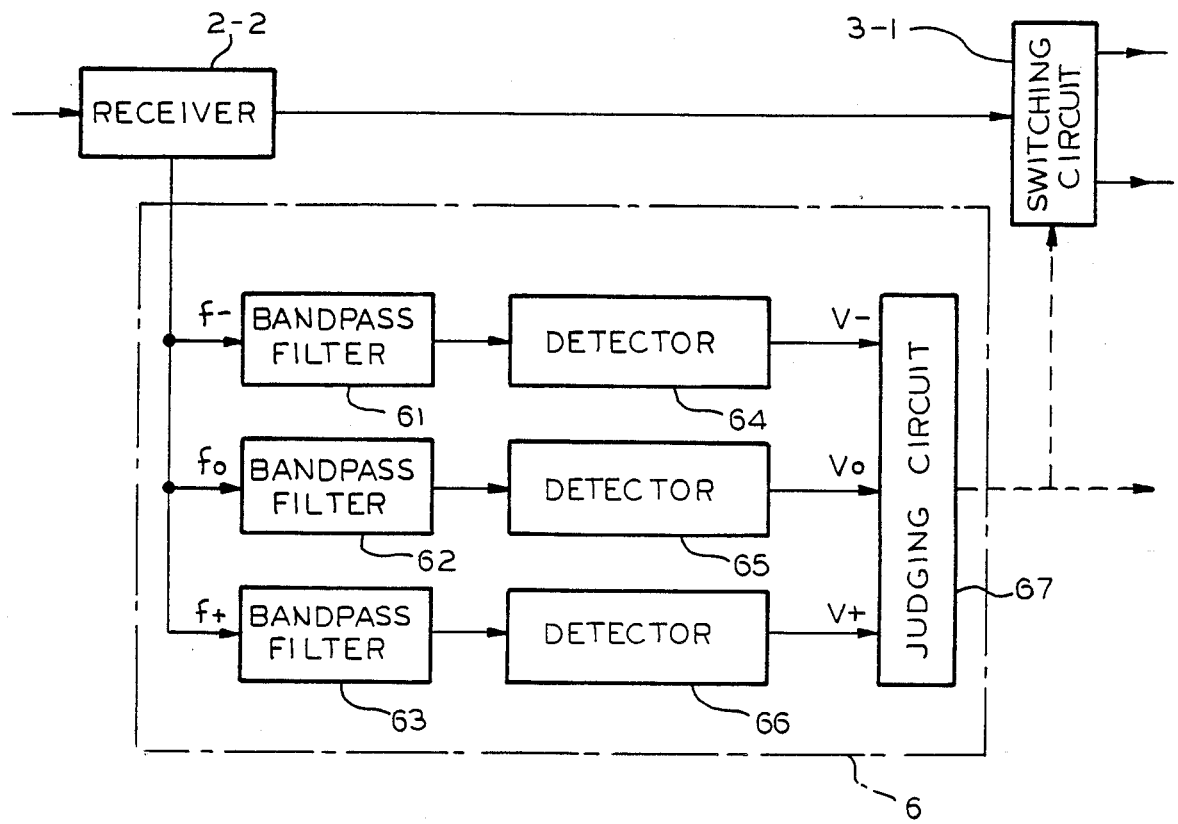
FIG. 2
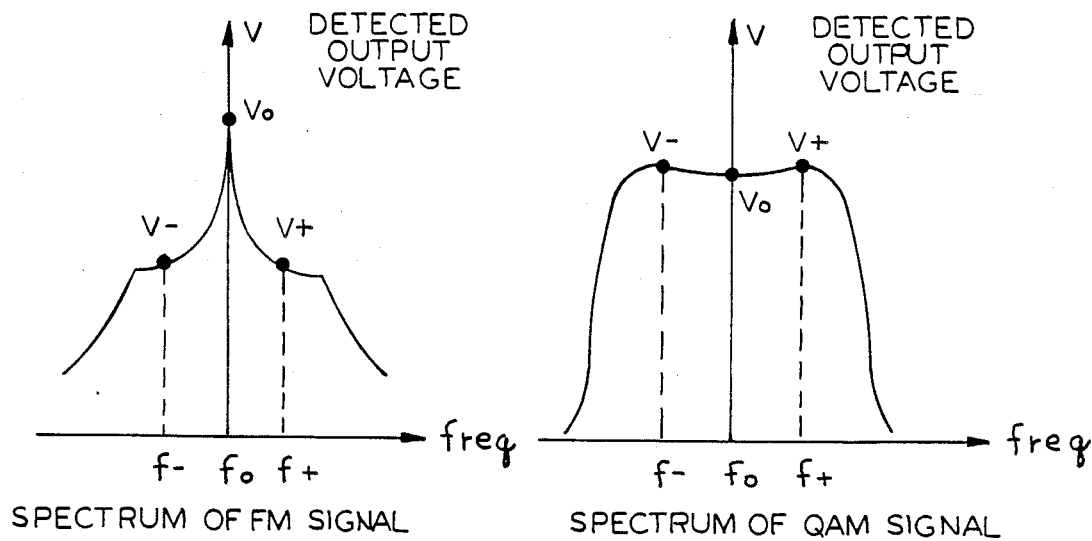
SPECTRUM OF FM SIGNAL
FIG. 3A
SPECTRUM OF QAM SIGNAL
FIG. 3B

MICROWAVE RELAY STATION HAVING A COMMON STANDBY CHANNEL FOR SIGNALS OF DIFFERENT TYPES OF MODULATION

This invention relates to microwave communication multichannel systems in which a standby channel transmission path is used to increase the reliability of the transmission paths of a group of channels, and more particularly to a transmission path switching system which makes common use of a standby transmission path which can be adjusted to accommodate signals which may have different kinds of modulation. Hereafter, such a system is called a "common standby channel switching system".

BACKGROUND

Nowadays in microwave communication lines the two most common types of modulation used are frequency modulation (FM) and quadrature amplitude modulation (QAM), and in multichannel lines it is not unusual for signals of both kinds of modulation, which are very different, to be simultaneously transmitted. Therefore, it is increasingly necessary, both to reduce cost and to make efficient use of available bandwidth, that a standby channel provided for such lines be one that can be commonly used by signals of both types of modulation. However, for signals of different types of modulation to be able to commonly use the same standby transmission path, it must be transparent to both types of signals.

Accordingly, an object of this invention is to provide a new and improved relay station employing a common standby channel switching system that eliminates the above disadvantages. A more particular object is to provide a relay station that can generate a control signal for the switching circuits 43 and 46 within the relay station itself without receiving switching information from a remote terminal station.

In keeping with one aspect of this invention, a microwave relay station comprises first and second channels for respectively transmitting two different types of signals, such as QAM and FM modulated signals. These have a common standby transmission channel that is selectively capable of transmitting the two different types of signals. The type of signal currently carried by the standby channel is identified by a detector circuit, such as one that can automatically distinguish differences in the frequency spectrums of the different types of signals. A selecting circuit responds to the output of the detector circuit by selecting between first and second transmitting means in the common channel, thereby dedicating it to the identified type of signal.

BRIEF DESCRIPTION OF THE DRAWING

The background of the invention and the invention itself, including its various features and the manner of obtaining them, will become more apparent and will be best understood by reference to the following description of embodiments of the invention taken in conjunction with the accompanying drawings, in which:

FIG. 2 is a system block diagram showing in greater detail an example of the detector circuit block appearing in FIG. 1;

FIG. 3A shows the spectrum of a received FM modulated signal and its relationship to the detected output voltages of the three detectors shown in FIG. 2;

FIG. 3B shows the spectrum of a received QAM modulated signal and its relationship to the detected output voltages of the three detectors shown in FIG. 2.

PRIOR ART

Figure 4:
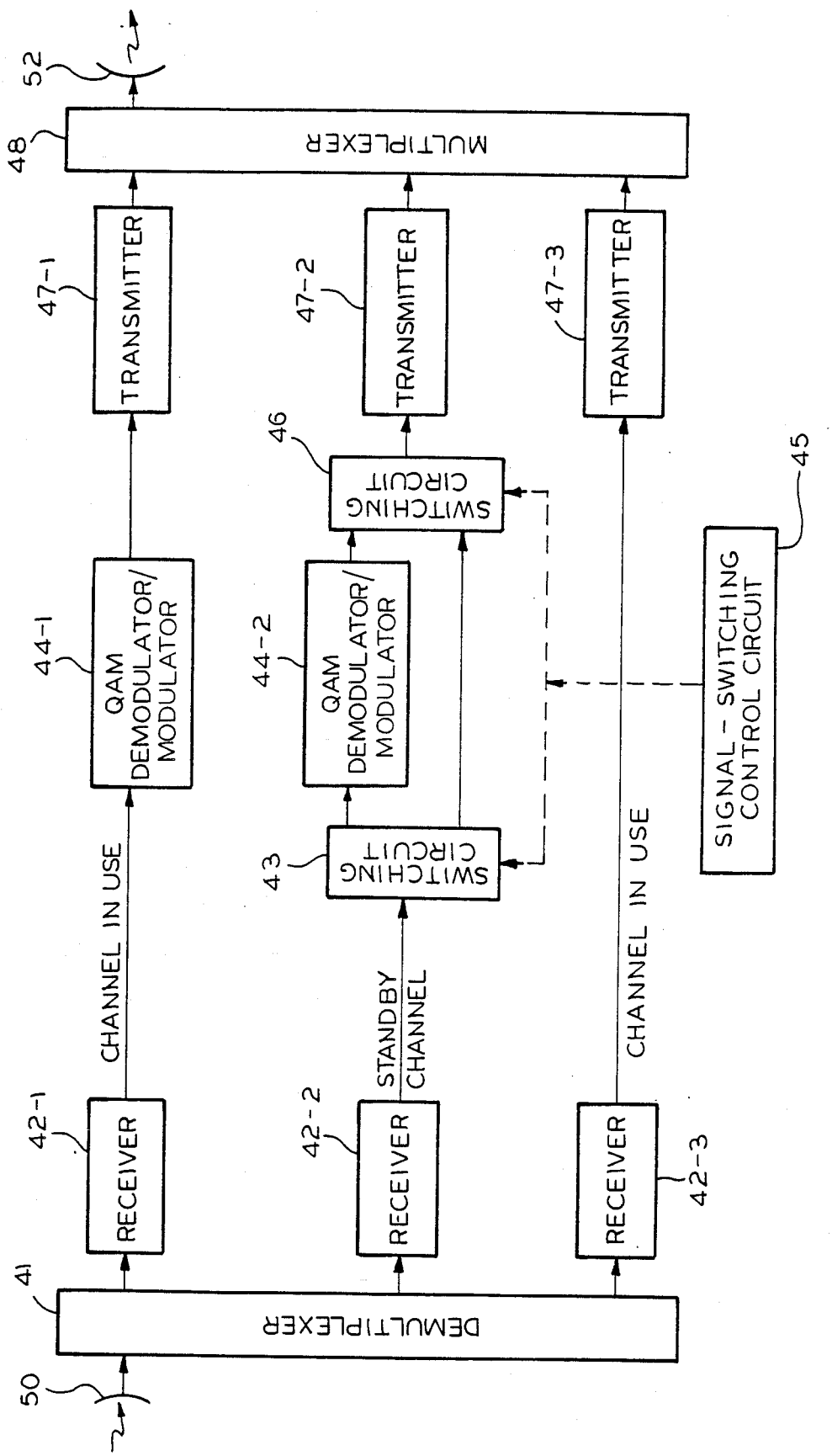
FIG. 4 shows a system block diagram of a prior art relay station having a common standby channel switching system for signals of different types of modulation, controlled by remote signals.

A conventional technique will first be discussed as background. FIG. 4 shows a prior art relay station for a multichannel system having a common standby channel switching system for signals of different types of modulation. A microwave signal picked up by a receiving antenna 50 is input to a demultiplexer 41, such as a frequency demultiplexer. Demultiplexer 41 distributes the signal to receivers 42-1, 42-2, and 42-3.

The output of receiver 42-1 is input to a regular QAM channel, and the output of receiver 42-3 is input to a regular FM channel; these are both shown as currently in use. The output of receiver 42-2 is input to a common standby channel, whose signal can be switched as needed between alternate transmission paths by switching circuits 43 and 46. Switching circuits 43 and 46 are controlled by a signal-switching control circuit 45.

The regular QAM channel and the upper branch of the common standby channel respectively have QAM demodulator/modulators 44-1, 44-2, whereas the regular FM channel and the lower branch of the common standby channel respectively have a direct path for FM signals. Each channel leads to a respective transmitter 47-1, 47-2, and 47-3 whose output is connected as input to a multiplexer 48 which feeds a transmitting antenna 52.

The FM signals in the relay station's FM channels have the convenient property that as long as the received FM signal quality remains above a predetermined minimum acceptable value, they can be fed directly to the next transmitter, such as transmitter 47-3. That is, they can be retransmitted without being demodulated. But in the case of the relayed QAM signals, to prevent them from becoming too weak they must be demodulated and the modulating waves reconstituted before they can be remodulated for transmission. So the QAM transmission paths used for QAM channels each use a QAM demodulator/modulator 44-1, 44-2.

Therefore, the signal-switching control circuit 45 is provided in the conventional common standby channel switching system to control the necessary switching of the differently modulated signals into appropriate alternate paths. Moreover, in the conventional system, one of the terminal stations in the relay needs to keep this control circuit 45 informed about which type of modulation is being used on the standby channel, and this is done by adding such information to the main signal before sending it.

In other words, when a relay station employs such a common standby channel switching system, it conventionally must additionally include a device capable of generating a signal-switching control signal in response to switching information embedded in the main signal received from a remote terminal station. This has the disadvantage of increasing the complexity, as well as cost, of the relay station unit.

Description of Preferred Embodiment of the Invention

Figure 1:
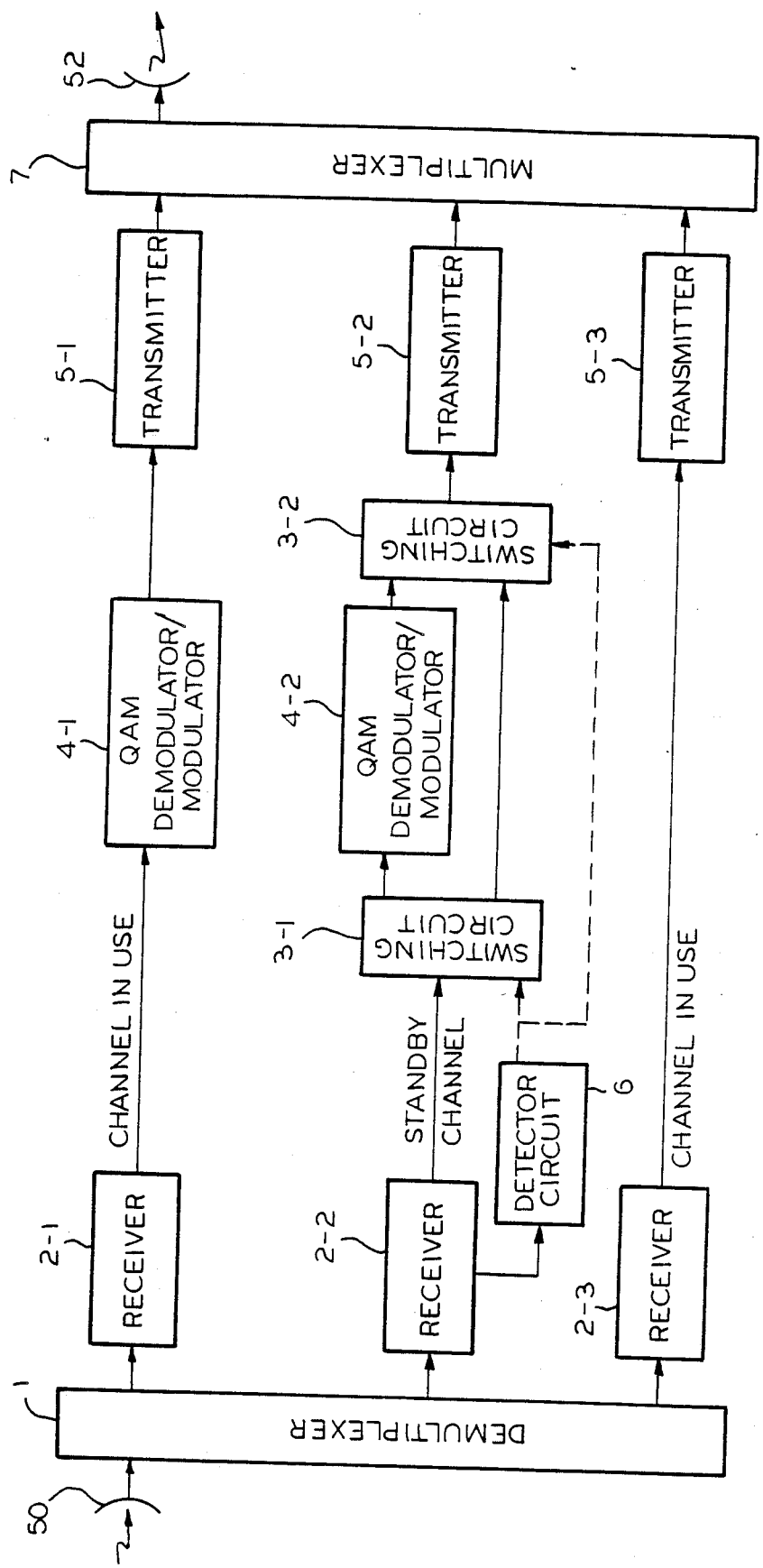
FIG. 1 shows a system block diagram of an embodiment of the invention in which a relay station has an automatic common standby channel switching system for signals of different types of modulation.

As shown in FIG. 1, a microwave station constructed in accordance with the teachings of this invention has a receiving antenna 50 which provides input to a demultiplexer 1 which distributes the signal to receivers 2-1, 2-2, and 2-3.

The outputs of receivers 2-1 and 2-3 are respectively input to regular QAM and FM channels; both shown as currently in use. The output of receiver 2-2 is input to a common standby channel, whose signal can be switched as needed between alternate transmission paths by switching circuits 3-1 and 3-2, controlled by a detector circuit 6.

The regular QAM channel and the upper branch of the common standby channel respectively have QAM demodulator/modulators 4-1 and 4-2, and the regular FM channel and the lower branch of the common standby channel respectively have a direct path for FM signals. Each channel leads to a respective transmitter 5-1, 5-2, and 5-3 whose output is connected as input to a multiplexer 7 which feeds a transmitting antenna 52.

The signal from demultiplexer 1 for the common standby channel traverses receiver 2-2 and is sent to both switching circuit 3-1 and detector circuit 6. Detector circuit then 6 judges the type of modulation of the input signal and sends a corresponding control signal to activate switching circuits 3-1 and 3-2 to adjust the standby channel for QAM or FM modulated signals.

FIG. 2 shows an embodiment of detector circuit 6, while FIGS. 3A and 3B respectively show the relationship of the FM or QAM spectrum of the received signal in the common standby channel to the detected output voltages $V_-$, $V_0$, and $V_+$ of detectors 64, 65 and 66.

As can be understood from FIGS. 3A and 3B, the spectrum of the signal in the common standby channel is clearly different depending on the type of modulation.

In order to detect these spectrum differences, the strength of the signal at least 3 sample points $f_-$, $f_0$, and $f_+$ on the frequency axis is detected by detectors 64, 65 and 66, which together respectively output a set of detected voltages $V_-$, $V_0$, and $V_+$. A judging circuit 67 (FIG. 2) determines whether the type of modulation is FM or QAM based on the relative differences within this set output voltages. The judging circuit 67 generates a corresponding control signal to control switching circuits 3-1 and 3-2.

For example, when the detected output voltage $V_0$ associated with the center frequency $f_0$ is substantially higher than the amplitudes of the voltages $V_+$ and $V_-$ respectively associated with the high and low frequencies, the judging circuit 67 can generate a control signal to make switching circuits 3-1 and 3-2 configure the common standby channel for FM. But should the detected output voltage $V_0$ not be substantially higher than the amplitudes of the voltages $V_+$ and $V_-$, the judging circuit 67 can generate a control signal to make switching circuits 3-1 and 3-2 configure the common standby channel for QAM.

For this reason, FIG. 2 shows that the signal from receiver 2-2 is input to a set of bandpass filters 61, 62 and 63 for respectively letting through just a narrow frequency band at each of the needed sample points ($f_-$, $f_0$, $f_+$) on the frequency spectrum. Then detectors 64, 65 and 66 convert the signal energy at the sample points into the corresponding detected output voltages $V_-$, $V_0$, and $V_+$.

Those skilled in the art will readily appreciate that the present system can be easily adapted to work with other types of modulation. For example, phase modulation could be used in place of QAM modulation.

As explained above, the present invention is particularly useful for a multichannel relay station employing a common standby channel switching system which must appropriately switch the standby transmission path to match the modulation type of a signal input to the standby channel. The invention provides the relay station with a relatively simple detector circuit which can generate and output the necessary signal-switching information from the received signal in the standby channel, thereby activating the switching circuits to adjust the standby channel for the type of modulation. This simplifies the construction of the relay station and lowers its cost.

While the principles of the invention have been described above in connection with specific apparatus and applications, it is to be understood that this description is made only by way of example and not as a limitation on the scope of the invention.

The claimed invention is:

1. A microwave relay station comprising: at least first and second channels for respectively transmitting two different types of signals which are QAM and FM signals, respectively; a standby transmission channel having first and second means for respectively transmitting said two different types of signals; detection means for identifying the type of said signals appearing in said standby channel, said detection means comprising three bandpass filters respectively tuned to high, low and center frequencies of signals passing through said standby channel; measuring means responsive to the outputs of said bandpass filters for determining amplitudes of the signals at said high, low, and center frequencies; selection means responsive to said detection means for selecting one of said first and second means, whereby said standby channel becomes dedicated to the transmission of said identified type of signal; and control means responsive to said determined amplitudes for controlling said selection means.

2. The relay station of claim 1 wherein said control means selects the one of said first and second transmitting means which is used for FM transmission when the signal amplitude at said center frequency is substantially higher than the amplitudes at said high and low frequencies, and selects the one of said first and second transmitting means which is used for QAM transmission when the amplitude at said center frequency is not substantially higher than the amplitudes at said high and low frequencies.

3. A relay station having channels dedicated to receiving and retransmitting FM and QAM signals respectively, at least one standby channel for transmitting either said FM or said QAM signals, detection means associated with said standby channel for measuring amplitudes of high, low, and center frequencies in said standby channel, and switching means responsive to said detection means for switching said standby channel to transmit FM signals responsive to a detection of amplitudes wherein said center frequency is substantially higher than said high and low frequencies and for switching said standby channel to transmit QAM signals responsive to a detection of amplitudes wherein said center frequency is not substantially higher than said high and low frequencies.

4. The relay station of claim 3 wherein said detection means comprises three bandpass filters coupled to receive signals appearing in said standby channel and respectively tuned to said high, low, and center frequencies; three detectors respectively coupled to the output of individually associated ones of said filters; and judging means coupled to the outputs of said detectors for determining the relative amplitudes of said high, low, and center frequencies.

5. The relay station of claim 4 and means responsive to said judging means for selectively operating said switching means.

6. The relay station of claim 3 and receiver means for receiving and transmitter means for retransmitting multiplexed multi-channel microwave signals; means responsive to said receiver means for demultiplexing said multi-channels and applying the resulting signals to inputs of said channels; means responsive to outputs of said channels for multiplexing said multi-channels for retransmission; means in dedicated FM channels for applying separated FM signals directly to said multiplexing means; and means in dedicated QAM channels for applying separated QAM signals to means for demodulating, reconstituting, and remodulating before applying them to said multiplexing means.

7. The relay station of claim 6 and first means in said standby channel for selectively applying separated FM signals directly to said multiplexing means; second means in said standby channel for demodulating, reconstituting and remodulating the separated QAM signals and applying them to said multiplexing means; and means responsive to said detection means for selecting between said first and second means.

8. A method of transmitting multiplexed microwave signals through a relay station, said method comprising the steps of:
dedicating at least first and second channels for respectively transmitting two different types of signals;
providing a standby transmission channel having first and second means for respectively transmitting said two different types of signals;
detecting the type of said signals appearing in said standby channels, said detecting step further comprising the steps of separating signals in said standby channel into high, low, and center frequencies, determining amplitudes of the signals at said high, low and center frequencies, and controlling said selecting step responsive to said determined amplitudes; and
selecting one of said first and second means responsive to said detecting, whereby the standby channel becomes dedicated to the transmission of said identified type of signal.

9. The method of claim 8 and the added step of selecting FM transmitting means responsive to said determined amplitudes when the amplitude at the center frequency is substantially higher than the amplitudes at the high and low frequencies, and selecting QAM transmitting means when the amplitude of the center frequency is not substantially higher than the amplitude of the high and low frequencies.

10. A relay station having channels dedicated to receiving and retransmitting first and second signals in different frequency spectrums respectively, at least one standby channel for transmitting either said first or said second signals, detection means associated with said standby channel for measuring amplitudes of high, low, and center frequencies in said standby channel, and switching means responsive to said detection means for switching said standby channel to transmit said first signals responsive to a detection of amplitudes wherein said center frequency is substantially higher than said high and low frequencies and for switching said standby channel to transmit said second signals responsive to a detection of amplitudes wherein said center frequency is not substantially higher than said high and low frequencies.

11. The relay station of claim 10 wherein said detection means comprises three bandpass filter coupled to receive signals appearing in said standby channel and respectively tuned to said high, low, and center frequencies; three detectors respectively coupled to the output of individually associated ones of said filters; and judging means coupled to the outputs of said detectors for determining the relative amplitudes of said high, low, and center frequencies.

12. The relay station of claim 11 and means responsive to said judging means for selectively operating said switching means.

13. The relay station of claim 10 and receiver means for receiving and transmitter means for retransmitting multiplexed multichannel microwave signals; means responsive to said receiver means for demultiplexing said multi-channels and applying the resulting signals to inputs of said channels; means responsive to outputs of said channels for multiplexing said multi-channels for retransmission; means in dedicated first signal channels for applying separated first signals directly to said multiplexing means; and means in dedicated second signal channels for applying separated second signals to means for demodulating, reconstituting, and remodulating before applying them to said multiplexing means.

14. The relay station of claim 13 and first means in said standby channel for selectively applying separated first signals directly to said multiplexing means; second means in said standby channel for demodulating, reconstituting and remodulating the separated second signals and applying them to said multiplexing means; and means responsive to said detection means for selecting between said first and second means.

15. The relay station of claim 10 wherein said first and second signals are FM and QAM, respectively.

* * * * *